(12) United States Patent
Cretin et al.

(10) Patent No.: US 9,528,441 B2
(45) Date of Patent: Dec. 27, 2016

(54) AIRCRAFT TURBOFAN COMPRISING AN INTERMEDIATE RING WITH SIMPLIFIED DOWNSTREAM SUPPORT

(71) Applicant: SNECMA, Paris (FR)

(72) Inventors: Fabrice Cretin, Moret sur Loing (FR); Yvan Guezel, Massy (FR); Francois Marie Paul Marlin, Villiers Sous Grez (FR); Thierry Georges Paul Papin, Varennes-Jarcy (FR); Alain Marc Lucien Bromann, Vulaines sur Siene (FR); Damien Lourit, Lieusaint (FR)

(73) Assignee: SNECMA, Paris (FR)

( * ) Notice: Subject to any disclaimer, the term of this patent is extended or adjusted under 35 U.S.C. 154(b) by 429 days.

(21) Appl. No.: 14/272,911

(22) Filed: May 8, 2014

(65) Prior Publication Data

US 2015/0159554 A1 Jun. 11, 2015

(30) Foreign Application Priority Data

May 16, 2013 (FR) ...................... 13 54384

(51) Int. Cl.
*F01B 25/00* (2006.01)
*F02C 7/04* (2006.01)
(Continued)

(52) U.S. Cl.
CPC .............. *F02C 7/04* (2013.01); *F01D 25/243* (2013.01); *F02K 3/06* (2013.01); *F05D 2230/60* (2013.01);
(Continued)

(58) Field of Classification Search
CPC ............ F01D 25/243; F02C 7/04; F02K 3/06; F05D 2230/60; F05D 2240/12; F05D 2260/30;F05D 2260/31; Y02T 50/672; Y10T 137/0402; Y10T 137/0536
See application file for complete search history.

(56) References Cited

U.S. PATENT DOCUMENTS 6,220,012 B1 * 4/2001 Hauser .................... F01D 5/145
60/772
6,905,303 B2 * 6/2005 Liu .......................... F01D 5/26
29/889.22

(Continued)

FOREIGN PATENT DOCUMENTS

EP 1 052 376 A2 11/2000
EP 1 403 486 A2 3/2004
(Continued)

OTHER PUBLICATIONS

French Preliminary Search Report issued Mar. 24, 2014, in French Application No. 13 54384 filed May 16, 2013 (with English Translation of Categories of Cited Documents).

*Primary Examiner* — Jesse Bogue
(74) *Attorney, Agent, or Firm* — Oblon, McClelland, Maier & Neustadt, L.L.P.

(57) ABSTRACT

This invention relates to an assembly (100) for an aircraft turbofan comprising a flowpath splitter (40) downstream from which there is firstly a fan flowpath (31) inner delimitation ring (44) and secondly a compressor case (42), the assembly comprising a plurality of outlet guide vanes (34) provided with an inner platform (50) located in the downstream continuity of the delimitation ring.
According to the invention, the assembly comprises at least one part (52) to support the delimitation ring (44), comprising a radially outer end (52b) fixed to a downstream part of this ring (44) and a radially inner end (52a) fixed to the compressor case (42).

9 Claims, 7 Drawing Sheets

(51) Int. Cl.
*F01D 25/24* (2006.01)
*F02K 3/06* (2006.01)

(52) U.S. Cl.
CPC ....... *F05D 2240/12* (2013.01); *F05D 2260/30* (2013.01); *F05D 2260/31* (2013.01); *Y02T 50/672* (2013.01); *Y10T 137/0402* (2015.04); *Y10T 137/0536* (2015.04)

(56) References Cited

U.S. PATENT DOCUMENTS

| | | | | |
|---|---|---|---|---|
| 7,967,571 | B2* | 6/2011 | Wood | F01D 5/141 |
| | | | | 416/243 |
| 8,517,677 | B2* | 8/2013 | Wood | F01D 5/142 |
| | | | | 415/199.5 |
| 8,740,556 | B2 | 6/2014 | Papin et al. | |
| 9,366,185 | B2* | 6/2016 | Salamon | F02C 7/20 |
| 2004/0060280 | A1* | 4/2004 | Malmborg | F02C 7/045 |
| | | | | 60/226.1 |
| 2007/0039310 | A1* | 2/2007 | Bil | F01D 5/22 |
| | | | | 60/226.1 |
| 2008/0098713 | A1* | 5/2008 | Orlando | F01D 15/12 |
| | | | | 60/226.1 |
| 2009/0081039 | A1* | 3/2009 | McCune | F02C 7/04 |
| | | | | 415/214.1 |
| 2012/0039710 | A1 | 2/2012 | Mathieu et al. | |
| 2014/0135134 | A1 | 5/2014 | Duchatelle et al. | |
| 2014/0193250 | A1 | 7/2014 | Papin et al. | |

FOREIGN PATENT DOCUMENTS

| | | |
|---|---|---|
| EP | 1 757 796 A2 | 2/2007 |
| EP | 1 801 389 A1 | 6/2007 |
| EP | 1 916 390 A2 | 4/2008 |

* cited by examiner

AIRCRAFT TURBOFAN COMPRISING AN INTERMEDIATE RING WITH SIMPLIFIED DOWNSTREAM SUPPORT

TECHNICAL FIELD

This invention relates to the field of aircraft turbofans and preferably turbojets. More precisely, it concerns the design of the zone around the junction between the outlet guide vanes and the fan flowpath inner delimitation ring, also called the intermediate ring.

STATE OF PRIOR ART

On existing turbofans, the fan flowpath inner delimitation ring has a downstream end that is mechanically connected to the platform of the outlet guide vanes. Therefore, mechanical means are provided to support the downstream end of the ring on the upstream edge of the outlet guide vane inner platform. For example, such mechanical support means have complementary shapes. An axial slit may be formed on one of these two elements, housing the tapered part formed on the other element.

In all cases, this normally requires that the inner platform of the outlet guide vanes should be designed to have a particular profile making the mechanical link with the downstream end of the fan flowpath delimitation ring. Such a profile can be obtained by machining when the blades concerned are metallic. However, when these blades are made from a composite material, the particular profile necessary to support the ring is much more difficult to obtain and can be expensive.

Such a disadvantage also occurs when a metal outlet guide vane has to be replaced by an outlet guide vane made from a composite material during maintenance.

PRESENTATION OF THE INVENTION

Therefore, the purpose of the invention is to at least partially overcome the above-mentioned disadvantages with embodiments according to prior art.

To achieve this, the purpose of the invention is an assembly for an aircraft turbofan comprising a flowpath splitter downstream from which there is firstly a fan flowpath inner delimitation ring and secondly a compressor case located radially inwards from the delimitation ring, the assembly also comprising a plurality of outlet guide vanes passing through the fan flowpath and being provided with an inner platform located in the downstream continuity of the delimitation ring.

According to the invention, the assembly comprises at least one part to support the delimitation ring, said support part comprising a radially outer end fixed to a downstream part of this ring and a radially inner end fixed to the compressor case.

Furthermore in the invention:
the delimitation ring is formed from a single part around 360°;
the assembly also comprises a coupling ring making the aerodynamic link between an upstream end of the delimitation ring and a downstream end of the outer delimitation wall of the fan flowpath defined by the splitter;
the splitter comprises an axial stop cooperating with a complementary axial stop on the upstream end of the delimitation ring, so as to retain the delimitation ring in the upstream direction;

the assembly is designed such that the delimitation ring can be put into position by sliding it along the upstream to downstream direction around the splitter, until cooperation between said axial stop and complementary axial stop. In particular, to enable such a function simplifying assembly and disassembly operations of elements forming part of the assembly from the upstream side, it is preferred that at the inner surface of the delimitation ring, only the complementary upstream end axial stop has a radius less than the maximum radius defined by the splitter.

Thus, the invention no longer uses the conventional technique by which the downstream part of the fan flowpath inner delimitation ring is retained by the outlet guide vane inner platforms. In this case, one or several support parts are judiciously positioned to fix the downstream part of this ring on the compressor case, thus eliminating the need for a mechanical link between the downstream end of the ring and the platforms of the outlet guide vanes. Consequently, the geometry of these platforms is less constraining because it no longer requires the part to form a mechanical link to support the ring by shape complementarity. The design of these blades is advantageously simplified, and it becomes possible to consider to making them from a composite material.

Turbine engines including the assembly specific to the invention may thus be made with outlet guide vanes made from a composite material or with outlet guide vanes made from a metal but with easy interchangeability with blades made from a composite material.

Furthermore by providing such a coupling ring, the upstream end of the delimitation ring is no longer required to provide aerodynamic continuity with the splitter. It would still be possible for it to perform this function, but the upstream end of the delimitation ring would have to have a very tapered or "pointed" shape. Such a shape can cause aerodynamic losses and difficulties with manufacturing to satisfy assembly standards. The preferred solution disclosed above comprising a coupling ring between the single piece delimitation ring and the splitter has advantages in terms of aerodynamic performances and ease of fabrication.

Preferably, the assembly comprises sealing means between the downstream end of the delimitation ring and the upstream edge of the inner platform of each outlet guide vane.

Preferably, the assembly does not have any mechanical means of supporting the downstream end of the delimitation ring on the upstream edge of the inner platform of each outlet guide vane.

Preferably, the upstream edge of the inner platform of each outlet guide vane is plane, and preferably orthogonal to a longitudinal axis of the turbine engine. It becomes even easier to make the blades.

Preferably, the radially outer end of each support part is fixed to the delimitation ring using screwed elements, preferably with axes orthogonal to the axis of the turbine engine, and even more preferably with these axes oriented radially.

According to one preferred embodiment of the invention, the radially inner end of each support part is fixed to the compressor case by screwed elements, preferably with axes parallel to the axis of the turbine engine. In this case, the support part(s) consist(s) exclusively of bolts, so that they can be easily fitted on existing turbine engines.

According to another preferred embodiment of the invention, the radially inner end of each support part is fixed to the compressor case by welding.

Alternately, each support part could be made in a single piece with the case or with angular sectors of this case when it is circumferentially segmented.

Preferably, there are several support parts circumferentially spaced from each other. Alternatively, a ring could be provided around 360°, possibly perforated to reduce weight.

As mentioned above, each outlet guide vane is made from a metallic material or a composite material.

Preferably, said coupling ring is made from a single piece or using several ring sectors added on independently between the splitter and the delimitation ring. Furthermore, the coupling ring is made from a metallic material, preferably titanium, aluminium or alloys of them, or a composite material or an elastic material, for example an elastomer.

The solution including a single-piece coupling ring reduces aerodynamic disturbances, while the use of a composite material creates a weight saving that is further increased when an elastic material is used, preferably an elastomer.

Another purpose of the invention is an aircraft turbofan comprising such an assembly, this turbofan preferably being a turbojet.

Finally, another purpose of the invention is an assembly method for an assembly as disclosed above, comprising a step consisting of installing the delimitation ring on an assembly comprising the compressor case, the splitter and each support part fixed to the case, by sliding this delimitation ring along the axial upstream-to-downstream direction around the splitter, until cooperation develops between said axial stop and said complementary axial stop. This step is followed by a step to assemble the coupling ring between the outer wall of the splitter and the delimitation ring.

Other advantages and characteristics of the invention will become clear in the non-limitative description given below.

BRIEF DESCRIPTION OF THE DRAWINGS

This description will be made with reference to the appended drawings among which.

DETAILED PRESENTATION OF PREFERRED EMBODIMENTS

Figure 1:
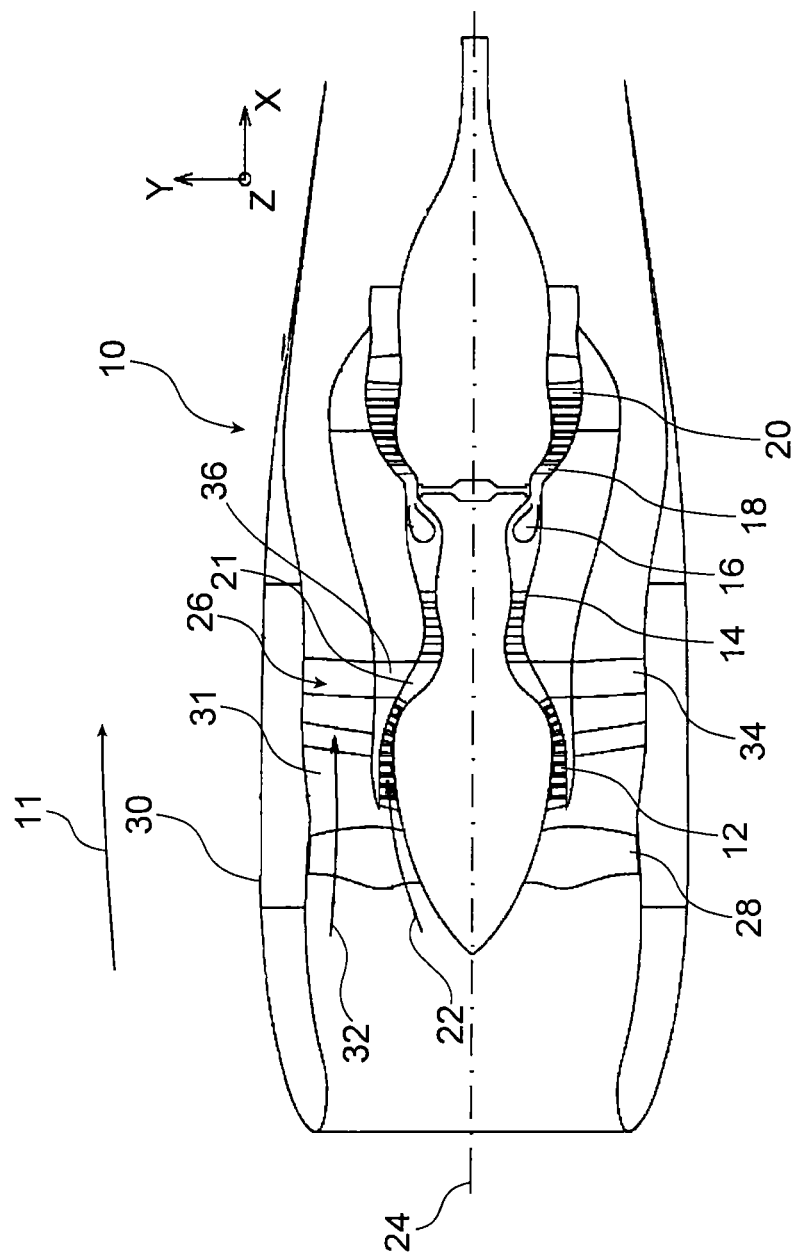
FIG. 1 shows a diagrammatic axial sectional view of a turbofan according to the invention.

As shown in FIG. 1 that is a diagrammatic view of the invention showing an axial section of a twin-spool turbofan turbojet 10, the turbojet comprises a low pressure compressor 12, a high pressure compressor 14, a combustion chamber 16, a high pressure turbine 18 and a low pressure turbine 20 defining a core engine flowpath 21 through which a core engine flow 22 passes, all in the upstream-to-downstream direction along the main direction of the gas flows diagrammatically shown by the arrow 11. The high pressure turbine 18 is fixed to the high pressure compressor 14 so as to form a high pressure casing, while the low pressure turbine 20 is fixed to the low pressure compressor 12 so as to form a low pressure casing, such that each turbine drives the associated compressor in rotation about a longitudinal axis of the turbojet 24 under the effect of the thrust of gases output from the combustion chamber 16.

A fan frame 26 is normally placed between the low pressure compressor 12 and the high pressure compressor 14.

In the case of turbofans that comprise a fan 28 surrounded by a nacelle 30 to generate a fan flow 32 through a fan flowpath 31, the fan frame 26 usually comprises outlet guide vanes 34 passing through this flow stream 31. These blades 34 resemble arms and are called OGV (Outlet Guide Vane).

Figure 2:
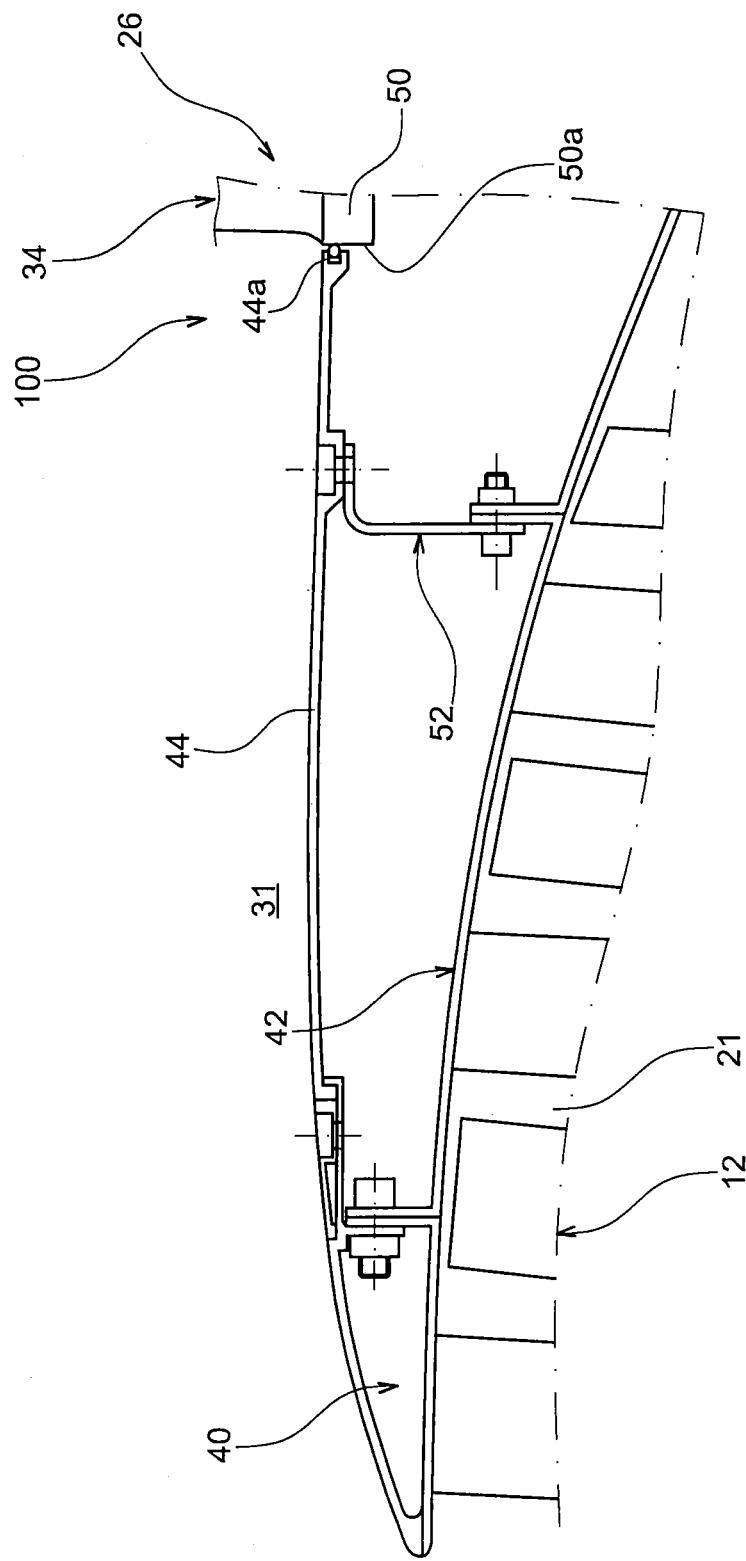
FIG. 2 shows a more detailed half-sectional view of an assembly belonging to the turbojet shown in the previous figure.

FIG. 2 shows an assembly 100 comprising a flow splitter 40 on the upstream end. The splitter 40 comprises an external wall 40*a* forming the inner delimitation of the fan flowpath 31, and an inner wall 40*b* forming the external delimitation of the core engine flowpath 21 corresponding to the low pressure compressor 12 inlet.

The inner wall 40*a* of the splitter 40 is extended in the downstream direction by a low pressure compressor case 42. This case 42 is preferably formed from several segments arranged end to end axially and assembled by screwing, and also participates in the external delimitation of the core engine flowpath 21, in the downstream continuity of wall 40*b*.

The outer wall 40*a* of the splitter 40 is prolonged in the downstream direction by a fan flowpath inner delimitation ring 44, also called the intermediate ring. As will be described below, there is preferably no continuity between the wall 40*a* of the splitter and the ring 44, since a coupling ring 45 is formed between these two elements to recreate the missing part of the flowpath 31.

The ring 44 extends axially as far as the fan frame 26 and more precisely has a downstream end 44*a* axially facing the outlet guide vanes 34 that pass through the fan flowpath 31. As can be seen in FIG. 2, the inner platform 50 of the vanes 34 is in downstream continuity of the intermediate ring 44 so as to benefit from a minimally disturbed aerodynamic junction between these elements 44, 50. Note that the platforms of the vanes 34 delimit the fan flowpath 31 at the turbojet fan frame. As will be described in detail below, simple sealing means are provided between the downstream end 44*a* and the upstream edge 50*a* of each blade platform.

One of the specific features of the invention is to provide one or several support parts 52 for the ring 44, this ring comprising an upstream end fixed by screwing to the outer wall of the splitter 40.

Each part 52 comprises a radially outer end fixed to a downstream part of the ring 44 and a radially inner end fixed to the case 42. Therefore, these support parts pass radially through the space between the case 42 of the low pressure compressor 12 and the intermediate ring 44, preferably to connect to the latter close to the downstream end 44a. This ring no longer needs to be mechanically connected to the outlet guide vanes 34, which simplifies the design of their inner platform.

Figure 3:
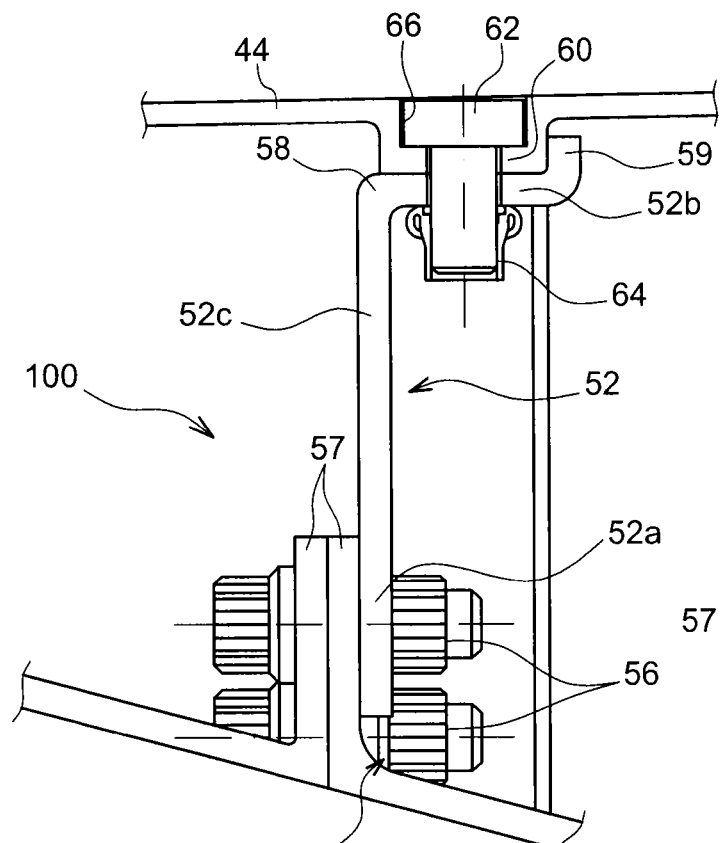
FIG. 3 shows a part of the assembly shown in the previous figure according to a first preferred embodiment of the invention.
Figure 4:
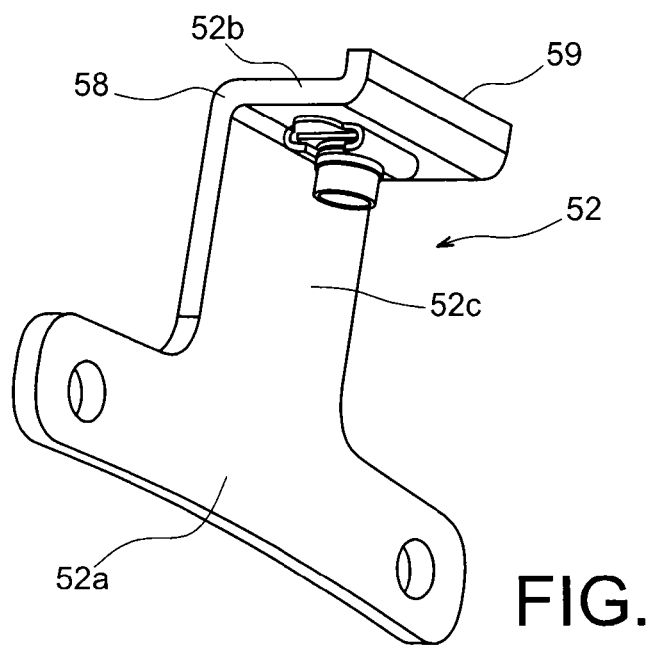
FIG. 4 shows a perspective view of one of the fan flowpath inner delimitation ring support parts belonging to the assembly in the previous figure.

With reference to FIGS. 3 and 4 that show a first preferred embodiment of the mechanical support parts 52, these support parts comprise a radially inner end 52a installed fixed on the case 42 by screwed elements, preferably bolts. The axes of these bolts 56 are parallel to the axis of the turbojet, and the end 52a is preferably orthogonal to this axis, extending radially towards the ring 44. For easier installation of the support parts 52, it is planned that the end 52a will be installed on existing attachment flanges 57 of the case segments 42 as can be seen in FIG. 3.

The end 52a is prolonged by a principal part 52c extending radially approximately in the same plane as the end, as far as the radially outer end 52b in the form of a seat, extending axially from a 90° bend 58 formed at the outlet from the main part 52c.

At the downstream end, the end 52b has a radial rim 59 that holds the ring 44 and positions it axially relative to the case 42. The rim 59 then cooperates with an inner rim 60 in the ring 44, through which the screwed elements pass, oriented radially. These are bolts 62 screwed into the floating nuts 64 supported on the inside by the seat shaped ends 52b, the head of the bolts being sunk into the orifices 66 of the ring 44.

The parts 52 thus provide axial and radial support for the downstream part of the ring 44 relative to the case 42, and this support is consolidated by screwed elements 62, 64 also providing support in the circumferential direction.

Figure 5:
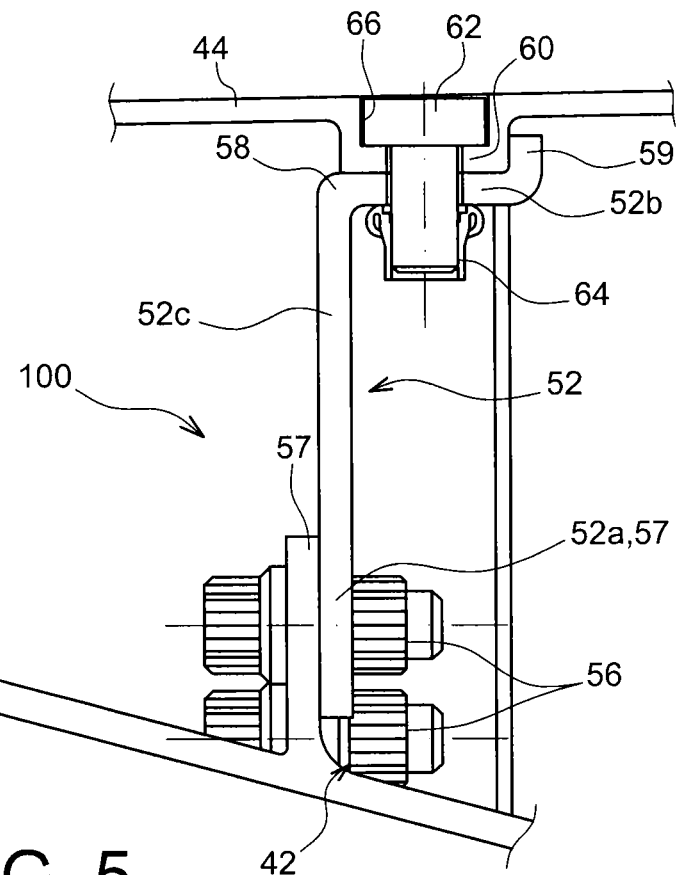
FIG. 5 shows a view similar to that in FIG. 3, with the assembly in the form of a second preferred embodiment of the invention.
Figure 6:
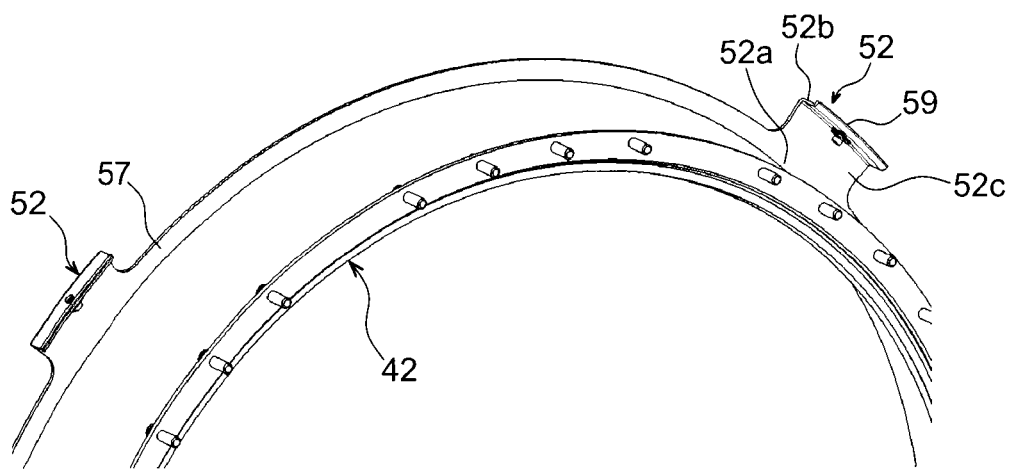
FIG. 6 shows a perspective view of support parts of the fan flowpath inner delimitation ring forming part of the assembly in the previous figure.

In this first preferred embodiment, as in the second embodiment that will be described with reference to FIGS. 5 and 6, the support parts 52 are at a circumferential spacing from each other. For guidance, there may be 4 to 12 of them, preferably distributed uniformly.

In the second preferred embodiment, each support part 52 is different from the part described in the first embodiment in that the radially inner end 52a is coincident with the case attachment flange 57, and its main part 52c is fixed by welding onto this flange. Alternately, a single part could be made for elements 57, 52, without going outside the scope of this invention.

Figure 7:
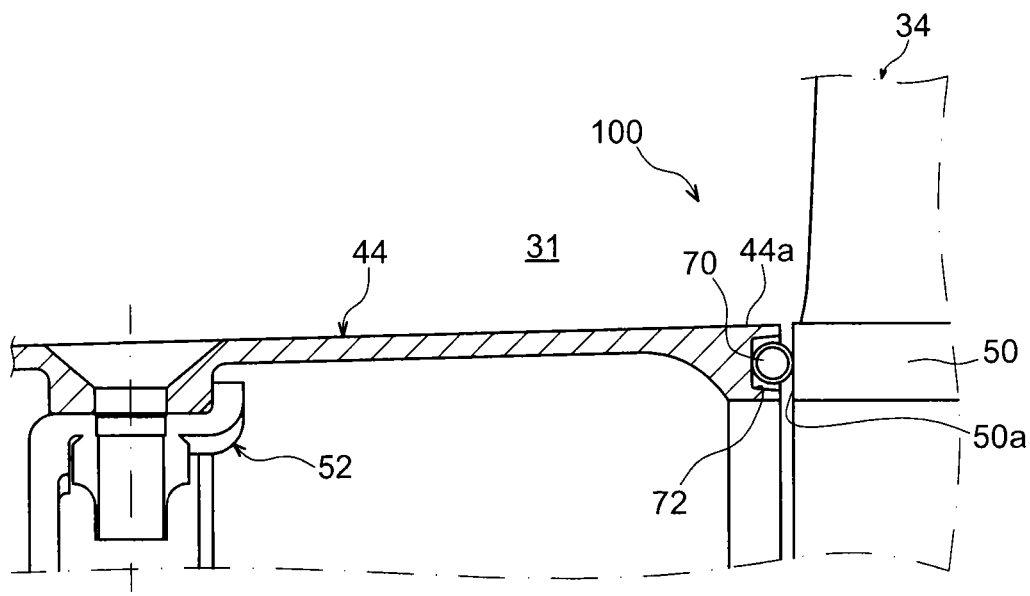
FIG. 7 shows an axial sectional view of the leak tight junction between the inner fan flowpath delimitation ring and one of the outlet guide vanes.

Finally with reference to FIG. 7, the figure shows that the assembly 100 comprises O-ring type sealing means 70 formed between the downstream end 44a of the intermediate ring 44 and the upstream edge 50a of the inner platform 50 of each outlet guide vane 34. The O-ring 70 is the only element that connects the two elements 44a, 50 directly, because the assembly does not have any mechanical means of supporting the end 44a on the upstream edge of the platform 50, or on any other element of the platform 50.

To support the O-ring 70, the O-ring is housed in an axial slit 72 in the downstream end 44a of the ring, while the upstream edge 50a of the platform 50 is plane, preferably orthogonal to the longitudinal axis 24 of the turbojet. The design of the blades 34 is thus simplified, and it becomes perfectly feasible to make them from a composite material, even though a metallic material, for example aluminium or one of its alloys, could be chosen. In any case, this raw shape of the inner platform 50, particularly the shape of its plane upstream edge 50a, enables metallic/composite interchangeability of the blades during the life of the turbojet. In this respect, note that composite material refers particularly to any material manufactured from a mix of resin and fibres, normally glass and/or carbon fibres.

Preferably, the splitter 40 is made from titanium or one of its alloys. On the other hand, the support parts 52 and the intermediate ring 44 are preferably made from aluminium or one of its alloys. Nevertheless, the ring 44 may be envisaged in composite material, namely a mix of fibres and resin, and preferably glass and/or carbon fibres.

In the preferred embodiments described above, the intermediate ring is made from a single part around 360°. Alternately, it could be made by several angular ring sectors added onto the assembly.

Figure 8:
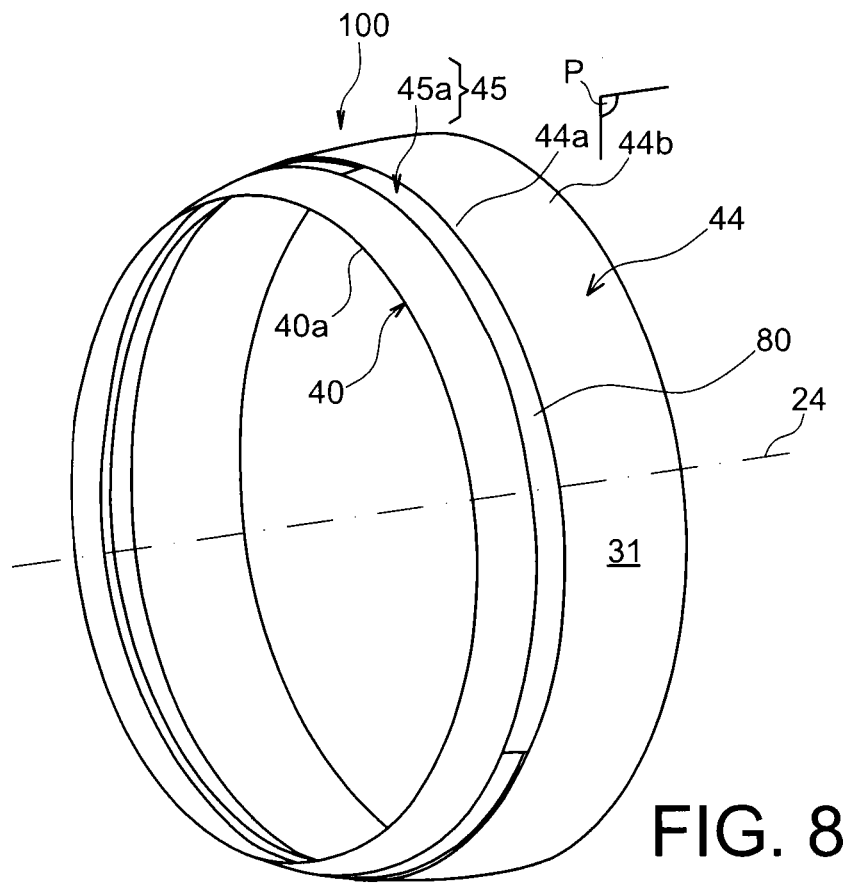
FIG. 8 shows a perspective view of part of an assembly according to one alternate embodiment.
Figure 9:
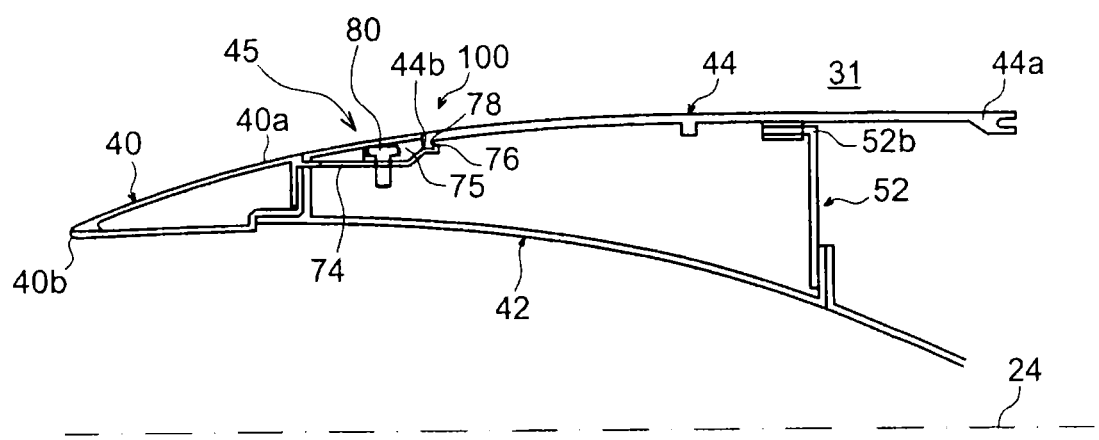
FIG. 9 shows a half-sectional view of the assembly part shown in the previous figure, taken along plane P.

If the part is a single part around 360°, the aerodynamic junction between the ring 44 and the wall 40a of the splitter preferably has a particular arrangement, as will be described with reference to FIGS. 8 and 9.

In this alternative embodiment, the only significant difference between the assembly 100 and previous assemblies is the orientation of the radially outer end 52b of each support part 52. It extends axially in the upstream direction, and no longer in the downstream direction.

As mentioned previously, there is no aerodynamic continuity between the downstream end of the wall 40a of the splitter 40 and the upstream end 44b of the intermediate ring 44. There is an axial gap between these two ends, leaving a space filled in by the coupling ring 45.

More precisely, the splitter 40 comprises a support and assembly trunnion 74 for the ring 45. This trunnion 74 is cylindrical with an axis 24, and extends axially in the downstream direction from the downstream end of the wall 40a, being radially set back from the wall. At its downstream end, it has an axial stop 76 extending radially outwards. This axial stop 76 cooperates with a complementary axial stop 78 formed on the upstream end 44b of the ring 44. These two stops 76, 78 are in contact and face each other in the axial direction, to retain the ring 44 in the upstream direction, in other words they prevent its upstream end 44b from moving in the downstream direction.

The ring 45 is thus fixed in position between the downstream end of the aerodynamic wall 40a and the upstream end 44b of the intermediate ring. Therefore, it acts as an aerodynamic link between these two elements, because it also participates in reconstruction of the fan flowpath 31 between the above-mentioned two elements. In this case, the ring 45 has no need for a pointed end, but it is in the form of a simple cover added on fixed in the space left free between elements 40a and 44b. For information, the cover inserted into the free space may be provided with local stiffeners 75 for the passage of the attachment elements.

The attachment is preferably made by bolt type attachment elements 80 preferably arranged radially and at a circumferential spacing from each other. The bolts 80 are screwed from the outside, pass through the ring 45 and the trunnion 74.

The coupling ring 74 can firstly be made by providing several ring sectors 45a added on independently onto the trunnion 74. For example, one of these angular ring sectors 45a is shown in FIG. 8. The sectors 45a are then arranged end-to-end to form the small missing part of the flowpath 31 around 360°.

The coupling ring 45 is designed to be made from a metallic material, preferably titanium, aluminium or one of their alloys. Alternately, it could be made from a composite material, for example of the type described above. According to another alternative, an elastic material could be used, for example an elastomer. In this case, the aerodynamic coupling ring can be made from a single part around 360°.

In addition to reducing the mass of the ring 45, this solution reduces aerodynamic disturbances because this ring is not broken down into sectors.

Now with reference to FIGS. 10a to 10d, these figures describe a preferred embodiment of the method of assembling the assembly 100 described with reference to FIGS. 8 and 9. Obviously, the method is applicable to the previous embodiments and to variants of them.

Figure 10A:
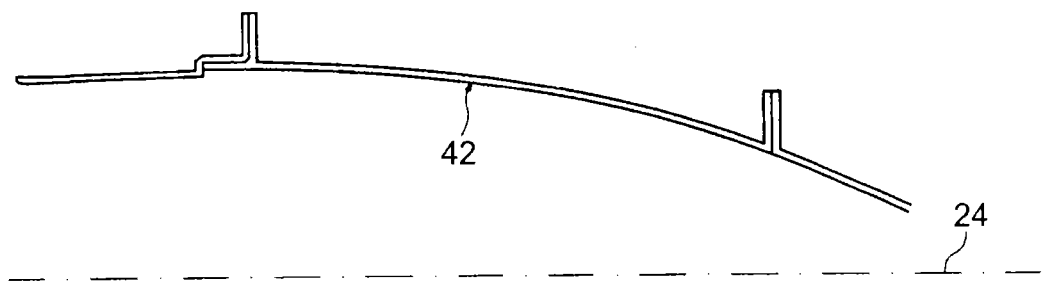
FIGS. 10 to 10*d* show different steps of a method of installing the assembly shown in FIGS. 8 and 9, according to one preferred embodiment.
Figure 10B:
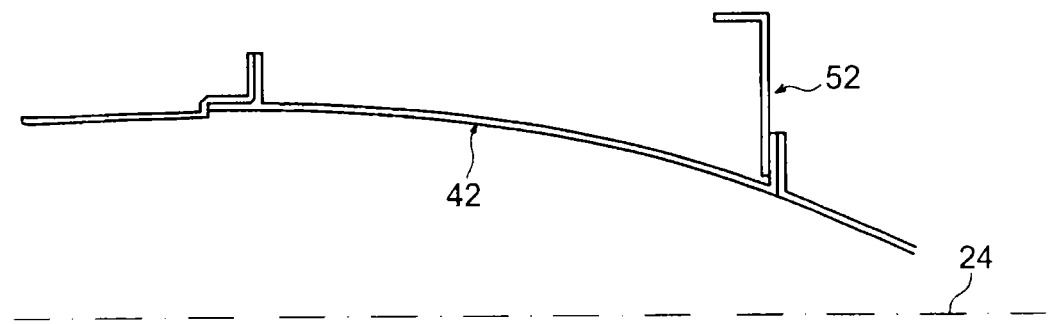

Firstly with reference to FIG. 10a, the compressor case 42 is obtained by the assembly of the different case segments. Then if the support parts 52 are added onto the case 42 and are not made in a single piece with the case, these parts 52 are assembled on this case, as can be seen in FIG. 10b.

Figure 10C:
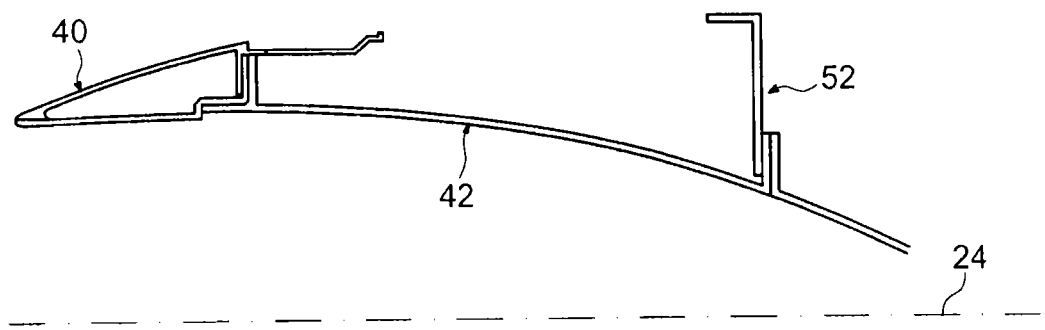

The splitter 40 is then installed on the forward part of the case 42 as can be seen in FIG. 10c.

Figure 10D:
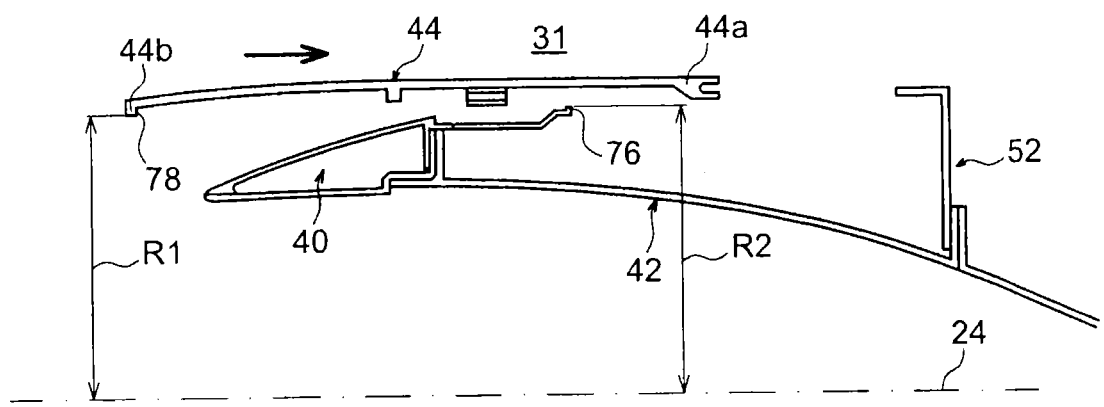

The de-icing system (not shown) can then be installed before one of the steps specific to this invention is performed, this step being shown diagrammatically in FIG. 10d.

The ring 44 is put into place on an assembly comprising the compressor case 42, the splitter 40 and each support part 52 fixed to the case 42. This placement is done by axially sliding the ring 44 centred on the axis 24, in the upstream-to-downstream direction around the splitter. It is slid into position as shown diagrammatically by the arrow in FIG. 10d. The movement continues until cooperation is obtained between the axial stops 76, 78.

This is done by assuring that only the complementary axial stop 78 of the upstream end 44b has a radius R1 less than the maximum radius R2 defined by the splitter at the inner surface of the ring 44, this maximum radius R2 preferably being at the axial stop 76. No mechanical interference hinders the sliding step described above, either between the ring 44 and the splitter 40, or between the ring 44 and the case 42 fitted with the parts 52.

Finally, once the ring 44 is in position, the coupling ring 45 is added fixed into the space left free between the downstream end of the wall 40a and the intermediate ring 44, by putting the ring 45 into position and then screwing the bolts 80.

Naturally, disassembly takes place using the same steps in the reverse order.

Obviously, those skilled in the art could make various modifications to the invention as disclosed above solely as non-limitative examples.

The invention claimed is:

1. An assembly for an aircraft turbofan comprising a flowpath splitter, said assembly comprising, downstream of said flowpath splitter, a fan flowpath inner delimitation ring and a compressor case located radially inwards from the delimitation ring, the assembly also comprising a plurality of outlet guide vanes passing through the fan flowpath and being provided with an inner platform located in the downstream continuity of the delimitation ring, wherein the assembly comprises at least one part to support the delimitation ring, said support part comprising a radially outer end fixed to a downstream part of this ring and a radially inner end fixed to the compressor case, wherein the delimitation ring is formed from a single part around 360°;

wherein the assembly also comprises a coupling ring making the aerodynamic link between an upstream end of the delimitation ring and a downstream end of the outer delimitation wall of the fan flowpath defined by the splitter;

wherein the splitter comprises an axial stop cooperating with a complementary axial stop on the upstream end of the delimitation ring, so as to retain the delimitation ring in the upstream direction; and wherein the assembly is designed such that the delimitation ring can be put into position by sliding it along the upstream to downstream direction around the splitter, until cooperation between said axial stop and complementary axial stop.

2. The assembly according to claim 1, comprising sealing means between the downstream end of the delimitation ring and the upstream edge of the inner platform of each outlet guide vane.

3. The assembly according to claim 1, wherein said assembly is free of any mechanical support for the downstream end of the delimitation ring on the upstream edge of the inner platform of each outlet guide vane.

4. The assembly according to claim 1, wherein the upstream edge of the inner platform of each outlet guide vane is plane, and orthogonal to a longitudinal axis of the turbine engine.

5. The assembly according to claim 1, wherein the radially outer end of each support part is fixed to the delimitation ring using screwed elements, preferably with axes orthogonal to the longitudinal axis of the turbine engine, and/or in that the radially inner end of each support part is fixed to the compressor case by screwed elements, preferably with axes parallel to the longitudinal axis of the turbine engine.

6. The assembly according to claim 1, comprising a plurality of support parts at a circumferential spacing from each other.

7. The assembly according to claim 1, wherein said coupling ring is made from a single piece or comprises several ring sectors added on independently between the splitter and the delimitation ring, and wherein said coupling ring comprises a material selected from the group consisting of a metallic material, titanium, aluminium, aluminium alloys, a composite material, an elastic material, and an elastomer.

8. An aircraft turbofan comprising an assembly according to claim 1.

9. A method for assembling an assembly according to claim 1, comprising a step of installing the delimitation ring, on an assembly comprising the compressor case, the splitter and each support part fixed to the case, by sliding this delimitation ring along the axial upstream-to-downstream direction around the splitter, until cooperation develops between said axial stop and said complementary axial stop, and wherein this step is followed by a step to assemble the coupling ring between the outer wall of the splitter and the delimitation ring.

* * * * *